Patented June 26, 1928.

1,675,181

UNITED STATES PATENT OFFICE.

MICHAEL LEVIN, OF NEW YORK, N. Y.

PROTEIN COMPOSITION.

No Drawing. Application filed September 15, 1927. Serial No. 219,820.

This invention relates to protein compounds, particularly protein compounds including extending agents. My invention particularly relates to protein compounds such as glue containing extending agents to maintain the protein compounds gelatinous and soft throughout continued periods of use. Still more particularly, my invention relates to gelatinous protein compounds and compositions including such compounds to maintain the same against deterioration or hardening for indefinite periods.

Where I have attempted to modify protein compounds, such as glue, in gelatinous form, by the addition thereto of glycerine, for certain purposes I have found that this material is not only expensive but fails for want of sufficient body. Where I have attempted to retain the gelatinous property of protein compounds by the addition of hygroscopic agents, such as calcium chloride, this extending agent is subject to be displaced and leached from the protein material containing the same, particularly when in contact with aqueous fluids. Furthermore, inorganic agents are objectionable by reason of their corrosive effect when used in contact with certain metals.

I have found that I may extend and maintain supple gelatinous protein compositions, such as glue, casein, albumen, blood or the like, by including therewith sodium lactate and/or compounds, organic mixtures including lactic acid, having hygroscopic properties.

My invention, therefore, has as an object thereof the provision of protein compositions including an extending agent having hygroscopic properties which will add novel characteristics to the protein material mixed therewith, which will displace, wholly or in part, organic and inorganic extending agents for protein; my invention more particularly has for its object the provision of protein compositions including new and novel extending agents effecting economy of production and facility of displacement in present industrial uses of protein compositions.

For the practice of my invention in connection with protein compositions, such as glue, as one example thereof, I may form an adhesive binder and cork composition.

*Example No. 1.*

28 parts gelatine or glue.
18 parts glycerine.
40 parts water.
26 parts sodium lactate.

The gelatine or glue may be dissolved in the water content in the usual way, whereupon the glycerine and sodium lactate are added. Preferably, the sodium lactate and glycerine are mixed with each other, intimately ground with the protein component and then dissolved in water. The glue may be varied within wide limits of proportions according to the rigidity desired to be imparted to the adhesive composition and the glycerine may also be entirely displaced by the sodium lactate solution. This adhesive may be used as a binder for cork particles to unite the same and mold them into sheets, plates or blocks. The products so made will have all the desirable characteristics resulting from the use of a glycerine extended gelatine but, additionally, will have augmented binding power resulting from the addition thereto of the lactate compound. The cork will be found to be supple and soft and adhere tenaciously to the binder, particularly where disks thereof are used to unite the same to metal caps.

For the production of printer's rolls, a suitable composition, wholly free from glycerine, may be made as follows:

*Example No. 2.*

1 part glue.
1-2 parts sodium lactate.

Here again the sodium lactate may be varied within a wide range of proportions in accordance with the physical characteristics desired to be imparted to the glue wherein the decrease of the sodium lactate content will give a more flexible product.

Where I have previously described the addition of sodium lactate or lactates generally to proteins, I have found that there is commercially available an inexpensive ingredient comprising what may perhaps be the desirable lactate component resulting as a by-product from the conversion process of starch to sugar. Such a material is designated on the market as hydrol. This material contains dextrose, dextrin and maltose, among other carbohydrates, and where sugar is produced from starch by hydrolysis, the mother liquor is obtained in concentrations of 42 to 52° Baumé. In addition to the ingredients specified, the mother liquor may contain nitrogenous decomposition products such as lactic acid, proprionic acid, valeric acid and the like. This material has the property of augmenting the adhesive quality of proteins, such as glue, and satisfies all the requirements of glycerine by reason of its hygroscopic nature. It is further superior to glycerine in that it gives greater body to the compound with which it is mixed. An example useful in preparing a cork composition is as follows:

Example No. 3.

28 pounds of gelatine or glue
40 pounds water.
17½ pounds of glycerine.
10-20 pounds hydrol.

In this example, also, the glycerine may be entirely displaced by hydrol. This mixture may be made as previously described in connection with the preparation of a sodium lactate compound for making the cork composition or as a binder for cork disks or otherwise adhering cork articles to metal.

For the production of the printer's roll composition, the hydrol may be substituted in amounts above specified in connection with sodium lactate.

In the claims, where I refer to hydrol by the designation as "the mother liquor resulting from the production of sugar by the hydrolysis of starch obtained in substantially concentrations of 42 to 52° Baumé," I intend to refer to this material by way of description thereof and not by limitation of proportions or concentrations.

Having thus described my invention and illustrated its use, what I claim as new and desire to secure by Letters Patent is—

1. A gelatinous composition comprising a protein and the mother liquor resulting from the production of sugar by the hydrolysis of starch obtained in substantially concentrations of 42 to 52° Baumé.

2. As a new composition of matter, inert particles having intimately mixed therewith an adhesive bond comprising glue and the mother liquor resulting from the production of sugar by the hydrolysis of starch obtained in substantially concentrations of 42 to 52° Baumé.

3. As a new composition of matter, pulverized cork adhesively bound by a binder comprising glue and the mother liquor resulting from the production of sugar by the hydrolysis of starch obtained in substantially concentrations of 42 to 52° Baumé.

4. As a new composition of matter, a protein, the mother liquor resulting from the production of sugar by the hydrolysis of starch obtained in substantially concentrations of 42 to 52° Baumé, glycerine and water.

5. An adhesive binder composition comprising glue, glycerine, the mother liquor resulting from the production of sugar by the hydrolysis of starch obtained in substantially concentrations of 42 or 52° Baumé and water.

6. An adhesive binder composition comprising 28 pounds of glue, 40 pounds of water, 17½ pounds of glycerine and 10 to 20 pounds of the mother liquor resulting from the production of sugar by the hydrolysis of starch obtained in substantially concentrations of 42 to 52° Baumé.

7. An extending composition for a protein comprising the mother liquor resulting from the production of sugar by the hydrolysis of starch obtained in substantially concentrations of 42 to 52° Baumé.

In witness whereof I have signed this specification this 14th day of September, 1927.

MICHAEL LEVIN.